(12) United States Patent
Takeda

(10) Patent No.: US 9,444,370 B2
(45) Date of Patent: Sep. 13, 2016

(54) ELECTRONIC DEVICE

(71) Applicant: KYOCERA CORPORATION, Kyoto (JP)

(72) Inventor: Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 659 days.

(21) Appl. No.: 13/870,716

(22) Filed: Apr. 25, 2013

(65) Prior Publication Data

US 2013/0285506 A1 Oct. 31, 2013

(30) Foreign Application Priority Data

Apr. 25, 2012 (JP) ................. 2012-100457

(51) Int. Cl.
| | | |
|---|---|---|
| *H01L 41/09* | (2006.01) | |
| *H01L 41/053* | (2006.01) | |
| *H01L 41/107* | (2006.01) | |
| *H01L 41/113* | (2006.01) | |
| *H02N 2/00* | (2006.01) | |
| *G06F 3/01* | (2006.01) | |
| *G06F 3/041* | (2006.01) | |
| *H04R 17/00* | (2006.01) | |

(52) U.S. Cl.
CPC .............. *H02N 2/001* (2013.01); *G06F 3/016* (2013.01); *G06F 3/041* (2013.01); *H04R 17/00* (2013.01)

(58) Field of Classification Search
USPC ................ 310/314–319, 311, 328, 338, 348; 345/173–178
See application file for complete search history.

(56) References Cited

U.S. PATENT DOCUMENTS

| | | | |
|---|---|---|---|
| 7,292,227 B2 | 11/2007 | Fukumoto et al. | |
| 8,284,567 B2 * | 10/2012 | Park et al. | ..................... 361/810 |
| 2002/0149561 A1 | 10/2002 | Fukumoto et al. | |
| 2010/0090564 A1 * | 4/2010 | Oh et al. | ...................... 310/328 |
| 2011/0260991 A1 | 10/2011 | Aono | |
| 2013/0162543 A1 * | 6/2013 | Behles | ......................... 345/173 |

FOREIGN PATENT DOCUMENTS

| | | | |
|---|---|---|---|
| JP | 2002-149312 A | | 5/2002 |
| JP | 2004-094389 | * | 3/2004 |
| JP | 2006150865 A | | 6/2006 |
| JP | 2007-065798 A | | 3/2007 |
| JP | 2011-034150 A | | 2/2011 |

OTHER PUBLICATIONS

An Office Action issued by the Japanese Patent Office on Nov. 10, 2015, which corresponds to Japanese Patent Application No. 2012-100457 and is related to U.S. Appl. No. 13/870,716; with Concise Statement of Relevance.
An Office Action issued by the Japanese Patent Office on Jun. 21, 2016, which corresponds to Japanese Patent Application No. 2012-100457 and is related to U.S. Appl. No. 13/870,716; with Concise Statement of Relevance and English language translation.

\* cited by examiner

*Primary Examiner* — Thomas Dougherty
(74) *Attorney, Agent, or Firm* — Studebaker & Brackett PC

(57) ABSTRACT

To reduce attenuation of vibration in provision of a tactile sensation when both of a piezoelectric element for providing a tactile sensation and a piezoelectric element for transmitting sound are provided to a panel, an electronic device 1 includes a panel 10, a first piezoelectric element 31 and a second piezoelectric element 32 that are attached to the panel 10, and a control unit 50 for controlling such that the second piezoelectric element 32 is driven to output sound and, when the panel 10 detects a contact, such that the first piezoelectric element 31 is driven, and that the control unit 50, when the panel 10 detects the contact, controls such that the second piezoelectric element 32 is driven as well as the first piezoelectric element 31.

4 Claims, 2 Drawing Sheets

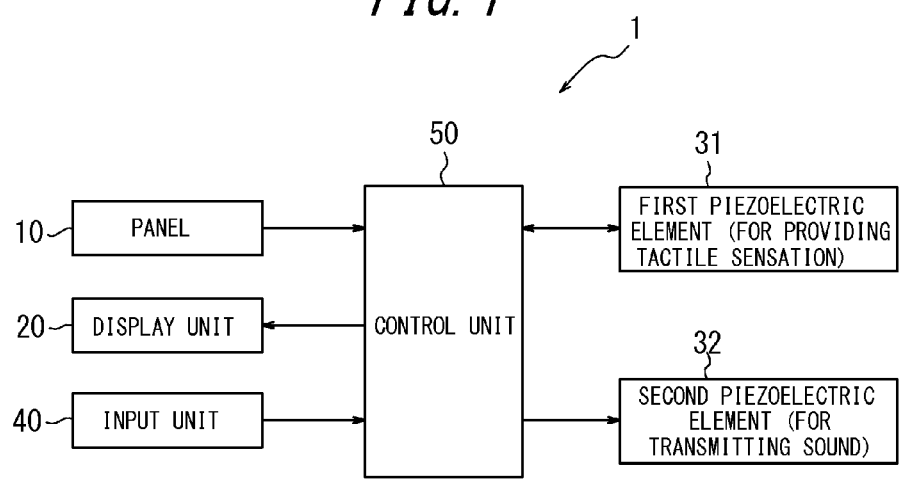

ELECTRONIC DEVICE

CROSS REFERENCE TO RELATED APPLICATION

This application claims priority to and the benefit of Japanese Patent Application No. 2012-100457 (filed on Apr. 25, 2012), the entire contents of which are incorporated herein by reference.

FIELD

Embodiments discussed herein relates to an electronic device having a panel such as a touch panel.

BACKGROUND

In recent years, electronic devices having the touch panel as a member for detecting an operation by a user have been widely used for mobile terminals such as smart phones; information equipments such as tablets, calculators and ticket vending machines; home electric appliances such as microwaves, TV sets and lighting equipments; industrial equipments (FA equipments) and the like.

There are known a variety of types of those touch panels, such as a resistive film type, a capacitive type, an optical type and the like. However, touch panels of any of these types receive an operation by a user's finger or a stylus pen and, unlike push-button switches, the touch panels themselves are not physically displaced when touched. Therefore, the user may not obtain feedback to the operation to the touch panel.

There has been suggested a feedback method for generating vibration when an operation to the touch panel is detected (for example, see Patent Document 1). Patent Document 1 describes an example using a piezoelectric element as a vibration unit. The vibration unit, by expanding and contracting the piezoelectric element, may bend the touch panel, thereby the vibration is generated. In this manner, an input apparatus described in Patent Document 1 may provide a tactile sensation when the user operates the touch panel.

CITATION LIST

Patent Document 1: JP2011-34150(A)

SUMMARY

Incidentally, there has been a panel device for vibrating the panel by applying a predetermined electric signal (sound signal) on the piezoelectric element and transmitting air conduction sound and human body vibration sound by transmitting the vibration of the panel to a human body.

By providing such a piezoelectric element for transmitting sound and a piezoelectric element for providing the tactile sensation described in Patent Document 1 to one panel, transmission of both of the tactile sensation and sound may be achieved by one device.

In consideration of such conditions, an electronic device capable of reducing attenuation of vibration in provision of the tactile sensation when both of the piezoelectric element for providing the tactile sensation and the piezoelectric element for transmitting sound are provided to the panel is provided.

An electronic device according to a first aspect includes:
a panel;
a first piezoelectric element and a second piezoelectric element that are attached to the panel; and
a control unit configured to control such that the second piezoelectric element is driven to output sound and, when the panel detects a contact, to control such that the first piezoelectric element is driven as well as the second piezoelectric element.

An electronic device according to a second aspect includes:
a panel;
a first piezoelectric element attached to the panel for detecting a pressure on the panel;
a second piezoelectric element attached to the panel; and
a control unit configured to control such that the second piezoelectric element is driven to output sound and, when data based on the pressure detected by the first piezoelectric element satisfies a predetermined standard while the panel is detecting a contact, to control such that the first piezoelectric element is driven as well as the second piezoelectric element.

An electronic device according to a third aspect includes:
a panel;
a first piezoelectric element for providing a tactile sensation;
a second piezoelectric element for transmitting sound; and
a control unit, wherein
the first piezoelectric element and the second piezoelectric element are attached to the panel, and
the control unit, when the panel detects a contact, controls such that the second piezoelectric element is driven as well as the first piezoelectric element.

A fourth aspect is the electronic device according to the third aspect, including:
a pressure detection unit configured to detect a pressure on a panel, wherein
the control unit, when data based on the pressure detected by the pressure detection unit satisfies a predetermined standard while the panel is detecting the contact, controls such that the second piezoelectric element is driven as well as the first piezoelectric element.

BRIEF DESCRIPTION OF DRAWINGS

FIG. 1 is a functional block diagram of an electronic device according to embodiments.

DESCRIPTIONS OF EMBODIMENTS

Figure 2A:
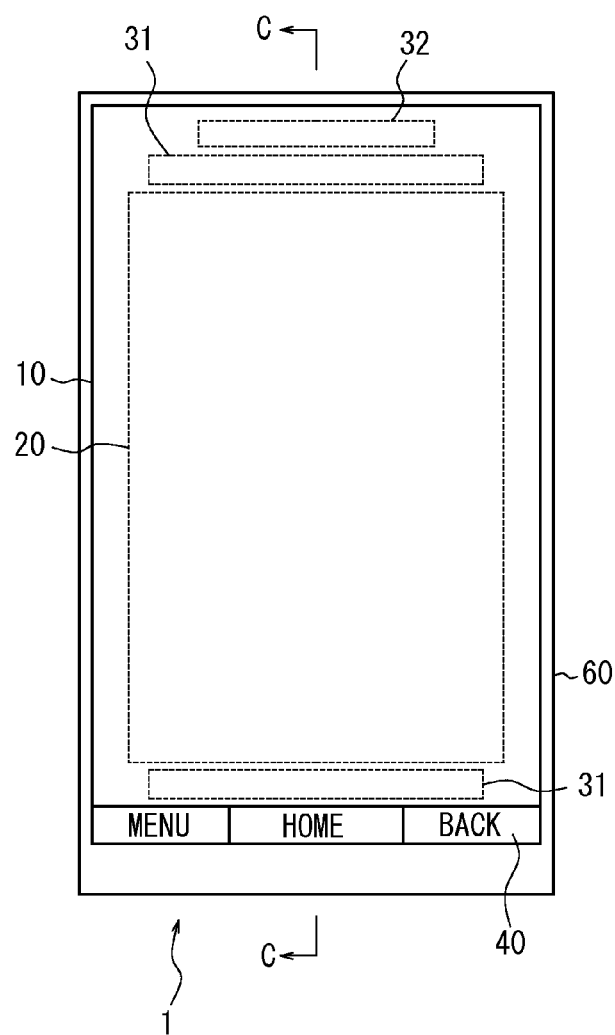
FIGS. 2A and 2B illustrate by an example of a structure of the electronic device.

In a panel device provided with a plurality of piezoelectric elements having different purposes are attached to one panel as described above, when the piezoelectric element for providing the tactile sensation is driven to generate vibration, it may be anticipated that the piezoelectric element for transmitting sound inhibits the vibration of the piezoelectric element for providing the tactile sensation. In such a case, therefore, there may be a concern that the tactile sensation provided by the piezoelectric element for providing the tactile sensation may be attenuated and the user may not obtain a good tactile sensation in operation.

Further, when such a device has dust-proof or water-proof modification, a method to provide a pad for dust-proof or water-proof between the panel and a housing is often employed. When such a device has the dust-proof or waterproof modification, the method to provide the pad for dust-proof or water-proof between the panel and the housing, or a method to solidly attach the panel to the housing without a gap, is often employed. In such cases, since the vibration of the piezoelectric element for providing the tactile sensation is more inhibited, there may be a concern that the tactile sensation obtained by the user in operation may be more deteriorated.

Such a situation may be caused not only when the piezoelectric element for transmitting the air conduction sound and the human body vibration sound is provided in addition to the piezoelectric element for providing the tactile sensation as described above. A similar situation occurs when, for example, a piezoelectric element for transmitting one of the air conduction sound and the human body vibration sound or a piezoelectric element for providing a tactile sensation at a different resonance frequency is provided in addition to the piezoelectric element for providing the tactile sensation.

According to embodiments discussed herein, when both of the piezoelectric element for providing the tactile sensation and the piezoelectric element for transmitting sound are provided to the panel, attenuation of vibration may be reduced in provision of the tactile sensation.

First Embodiment

The following is a description of an electronic device according to a first embodiment, with reference to the accompanying drawings. The electronic device according to the present embodiment may be a device provided with a touch panel, such as a mobile phone, a smart phone, a tablet, a laptop PC or the like. However, the present embodiment is not limited to these mobile devices but may be various electronic devices having the touch panel, such as a desktop PC, a home electric appliance, an industrial equipment (FA equipment), a special purpose terminal and the like.

FIG. 1 is a functional block diagram of the electronic device according to the first embodiment.

As illustrated in FIG. 1, an electronic device 1 according to the first embodiment includes a panel 10, a display unit 20, a first piezoelectric element 31, a second piezoelectric element 32, an input unit 40 and a control unit 50.

The panel 10 may be a touch panel for detecting a contact or a cover panel for protecting the display unit 20. Preferably, the panel 10 may be made of, for example, glass or synthetic resin such as acrylic. The panel 10 may be made of, for example, glass or synthetic resin such as acrylic. Preferably, the panel 10 is in a plate shape. The panel 10 may be a flat plate or a curved plate having a smoothly sloping surface. When the panel 10 is the touch panel, the panel 10 detects a contact by a user's finger, a stylus pen or the like. The touch panel may be any of a capacitive type, a resistive film type, an optical type, a surface acoustic wave type (or an ultrasonic type), an infrared type, an electromagnetic type, a load detection type and the like.

Preferably, the panel 10 is disposed on a housing or the like by an appropriate means in a vibratable manner. That is, when all peripheries of the panel 10 are firmly fixed to the housing, amplitude of vibration of the panel 10 may not be earned and a good tactile sensation may not be provided to a user. Accordingly, it may be preferable that, for example, by providing the panel 10 on the housing via an elastic member or by partially fixing the panel 10 to the housing, the panel 10 is provided to the housing in the vibratable manner.

When the panel 10 is constituted by using a member such as the touch panel, the panel 10 detects the contact to a touch face by the user's finger or the stylus pen and outputs information about a position of the contact. Thereby, the control unit 50 may obtain the position of the contact detected by the panel 10.

The display unit 20 may be a display device such as a liquid crystal display, an organic EL display or an inorganic EL display. The display unit 20 may display various information, images and objects such as keys and buttons on a screen. The display unit 20 may be arranged on a rear face of the panel 10. The display unit 20 may be arranged on the rear face of the panel 10 by a joint member (for example, adhesive). The display unit 20 may be disposed separately from the panel 10 and supported by the housing of the electronic device 1. When the panel 10 is constituted by using the member such as the touch panel, the panel 10 may be preferably constituted by, for example, a clear member and the display unit 20 may be arranged on a rear side of the panel 10. In this case, the display unit 20 may display graphic images of the objects of the keys and buttons and a pressing operation to the object by the user may be detected on the panel 10.

The first piezoelectric element 31 and the second piezoelectric element 32 are elements that, when an electric signal (a voltage) is applied thereon, expand and contract, or bend, according to an electromechanical coupling coefficient of constituting material. These elements may be made of, for example, ceramic or crystal. The first piezoelectric element 31 and the second piezoelectric element 32 may be a unimorph, a bimorph or a laminated piezoelectric element. The laminated piezoelectric element includes a laminated bimorph element having laminated bimorphs (in 16 layers or 24 layers, for example). The laminated piezoelectric element is formed in a laminated structure constituted by using a plurality of dielectric layers including, for example, PZT (lead zirconate titanate) and electrode layers arranged between the plurality of dielectric layers. Upon application of the electric signal (voltage), the unimorph expands and contracts, and the bimorph bends.

Preferably, the first piezoelectric element 31 and the second piezoelectric element 32 may be disposed on the rear face of the panel 10 (an inner surface of the electronic device 1). The first piezoelectric element 31 and the second piezoelectric element 32 may be attached to the panel 10 by using a joint member (for example, a double-sided tape). Or, the first piezoelectric element 31 and the second piezoelectric element 32 may be attached to the panel 10 via an intermediate member (for example, a sheet metal). The first piezoelectric element 31 and the second piezoelectric element 32 may be disposed on the rear face of the panel 10 and separated from an inner surface of the housing by a predetermined distance. Preferably, the first piezoelectric element 31 and the second piezoelectric element 32 are separated from the inner surface of the housing by the predetermined distance when expand and contract, or bend, as well. That is, the distance between the first piezoelectric element 31 or the second piezoelectric element 32 and the inner surface of the housing is preferably larger than a maximum deformation amount of the first piezoelectric element 31 or the second piezoelectric element 32.

According to the present embodiment, the first piezoelectric element 31 is a piezoelectric element used mainly for providing the tactile sensation. Accordingly, the first piezoelectric element 31 may be preferably designed to have a frequency characteristic suitable for providing a predetermined tactile sensation based on the electric signal from the control unit 50. On the other hand, the second piezoelectric element 32 according to the present embodiment is a piezoelectric element used mainly for transmitting sound. Accordingly, the second piezoelectric element 32 may be preferably designed to have a frequency characteristic suitable for transmitting a predetermined sound based on the electric signal from the control unit 50.

The input unit 40 detects an input operation by the user and may be constituted by using, for example, an operation button (operation key). When the panel 10 is the touch panel, the panel 10 also may detect the contact by the user.

The control unit 50 is a processor for controlling the electronic device 1. The control unit 50 applies a predetermined electric signal on the first piezoelectric element 31 and the second piezoelectric element 32. The control unit 50, when the panel 10 detects the contact, drives the first piezoelectric element 31 by applying the electric signal thereon.

Also, the control unit 50 drives the second piezoelectric element 32 by applying the electric signal thereon and controls output of the sound. When the control unit 50 controls output of the sound by driving the second piezoelectric element 32 as described above, the control unit 50 may control such that the second piezoelectric element 32 is driven based on a trigger for outputting the sound (based on a sound signal or the like) from a predetermined application or the like.

The voltage applied on the second piezoelectric element 32 by the control unit 50 may be, for example, ±15 V, which is higher than an applied voltage ±5 V of a so-called panel speaker aiming conduction of the air conduction sound, instead of the human body vibration sound. Thereby, when the user presses the panel 10 against a user's body applying a force of, for example, 3 N or larger (a force of 5 N to 10 N), the panel 10 may be sufficiently vibrated generating the human body vibration sound through a part of the user's body. The application voltage may be appropriately adjusted based on fixing intensity of the panel 10 to the housing or a support member, or on performance of the first piezoelectric element 31 or the second piezoelectric element 32.

When the control unit 50 applies the electric signal on the first piezoelectric element 31 and the second piezoelectric element 32, the first piezoelectric element 31 and the second piezoelectric element 32 expand and contract in longitudinal directions thereof. At this time, the panel 10 having the first piezoelectric element 31 and the second piezoelectric element 32 attached thereto is deformed following expansion and contraction of the first piezoelectric element 31 and the second piezoelectric element 32 and thus vibrates.

When the second piezoelectric element 32 expands and contracts and the panel 10 vibrates, the panel 10 generates the air conduction sound and, when the user contacts a part of the user's body (for example, the cartilage of the outer ear), generates the human body vibration sound through the part of the body. Then, the control unit 50 transmits the air conduction sound and the human body vibration sound to an object in contact with the panel 10. For example, the control unit 50 may apply an electric signal corresponding to, for example, a sound signal of voice of a person on the other end of a call on the second piezoelectric element 32, such that the air conduction sound and the human body vibration sound corresponding to the sound signal are generated. The sound signal may be music including an incoming call melody or a song. The sound signal associated with the electric signal may be based on music data stored in an internal memory of the electronic device 1 or music data stored in an external server to be played via a network.

The panel 10 vibrates, as well as in an attachment region where the second piezoelectric element 32 is attached, in an region separated from the attachment region. The panel 10 has a plurality of regions for vibrating in a direction intersecting with a principal surface of the panel 10 in a vibration region. In each of the plurality of regions, a value of vibration amplitude changes from plus to minus or vice versa with time. The panel 10 vibrates in such a manner that, at a given moment, parts with relatively large vibration amplitude and parts with relatively small vibration amplitude appear to be randomly or periodically distributed approximately over the entire panel 10. That is, a plurality of wave vibrations are detected over the entire panel 10. In order to reduce attenuation of the vibration of the panel 10 described above when the user presses the panel 10 against the user's body applying the force of 5 N to 10 N, for example, the control unit 50 may apply a voltage of ±15 V on the second piezoelectric element 32. Thereby, the user may hear the sound by contacting the ear to the region separated from the attachment region of the panel 10 described above.

Figure 2B:
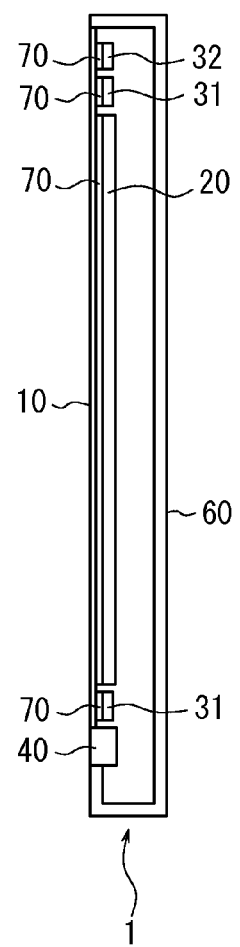

FIGS. 2A and 2B illustrate an example of a housing structure of the electronic device 1 according to the first embodiment. FIG. 2A is a front view, and FIG. 2B is a cross-sectional view taken from line C-C of FIG. 2A.

The electronic device 1 illustrated in FIGS. 2A and 2B is a smart phone having a touch panel formed of a glass plate serving as the panel 10 arranged on a front face of a housing 60 (for example, a metallic or resin case). The panel 10 and the input unit 40 are supported by the housing 60. The display unit 20, the first piezoelectric element 31 and the second piezoelectric element 32 are attached to the panel 10 via respective joint members 70. In an example illustrated in FIG. 2A, the first piezoelectric element 31 and the second piezoelectric element 32 are adhered on the rear side of the panel. In order to illustrate accordingly, the first piezoelectric element 31 and the second piezoelectric element 32 are indicated by broken lines in FIG. 2A. The joint member 70 is adhesive or a double-sided tape having thermosetting property or ultraviolet curable property such as, for example, optical elastic resin, which is clear acrylic ultraviolet curable adhesive. Each of the panel 10, the display unit 20, the first piezoelectric element 31 and the second piezoelectric element 32 has an approximately rectangular shape.

As illustrated in FIG. 2A, the display unit 20 is arranged approximately at the center of a width direction of the panel 10. Also, the first piezoelectric element 31 and the second piezoelectric element 32 are arranged having predetermined distances from an end of a longitudinal direction of the panel 10 in such a manner that, near the end, longitudinal directions of the first piezoelectric element 31 and the second piezoelectric element 32 line along a short side of the panel 10.

Although FIGS. 2A and 2B illustrate a structure in which the display unit 20, the first piezoelectric element 31 and the second piezoelectric element 32 are arranged parallel to one another on the rear face of the panel 10, arrangements of these components are not limited to the example illustrated in the figure. For example, at least one of the first piezoelectric element 31 and the second piezoelectric element 32 may be arranged parallel to a longitudinal direction of the electronic device 1 (a vertical direction in FIG. 2A). According to the present embodiment, that is, any structure is applicable when the first piezoelectric element 31 and the second piezoelectric element 32 attached to the panel 10 may transmit vibration to the panel 10.

Also, although FIGS. 2A and 2B illustrate a structure in which the display unit 20 is adhered to the rear side of the panel 10 via the joint member 70, arrangement of the display unit 20 is not limited to the example illustrated in the figure. For example, the display unit 20 may be adhered to the rear side of the panel 10 without the joint member 70, or arranged inside the housing 60 instead of being adhered to the panel 10. When the display unit 20 is arranged inside the housing 60, the display unit 20 may be directly fixed to the inside of the housing 60 or to a substrate or a display unit holder arranged inside the housing 60. As illustrated in FIGS. 2A and 2B, in a case that the display unit 20 is arranged on the rear side of the panel 10, when the touch panel is constituted by using the panel 10 and the display unit 20, the display unit 20 may display any user interface and the panel 10 may detect the operation by the user. FIG. 2A illustrates a state in which the display unit 20 indicated by broken lines is adhered to the rear side of the panel 10.

Note that, in FIGS. 2A and 2B, in a space closed by the housing 60 and the panel 10, elements other than the display unit 20, the first piezoelectric element 31, the second piezoelectric element 32, the input unit 40 and the joint member 70 are omitted. Accordingly, the electronic device 1 may have elements other than those illustrated in FIGS. 2A and 2B such as, for example, substrates for the control unit 50 and other units or components. In FIG. 2A, also, in a region on the panel 10 not required to transmit a display of the display unit 20 (that is, in a region where the panel 10 and the display unit 20 do not overlap with each other), a peripheral region of the panel 10 may be preferably painted or covered with a bezel. Thereby, appearance of the first piezoelectric element 31 and the second piezoelectric element 32 from an outside of the electronic device 1 may be prevented.

Next, an operation performed by the control unit 50 according to the present embodiment will be described.

In the electronic device 1 according to the present embodiment, the control unit 50 controls such that the second piezoelectric element 32 is driven to output sound. In the electronic device 1, thereby, the second piezoelectric element may substantialize a function to output sound and transmit the sound to the user. Also, in the electronic device 1 according to the present embodiment, the control unit 50, when the panel 10 detects the contact, controls such that the first piezoelectric element 31 is driven. In the electronic device 1, thereby, the first piezoelectric element may substantialize a function to generate vibration and provide the tactile sensation to the user.

As described above, on the other hand, in a case that a plurality of piezoelectric elements for different usages are attached to one panel, when the piezoelectric element for providing the tactile sensation is driven to generate vibration, the piezoelectric element for transmitting sound fixed to the panel may inhibit the vibration of the piezoelectric element for providing the tactile sensation. As such, the control unit 50 according to the present embodiment, when the panel 10 detects the contact, controls such that the second piezoelectric element 32 is driven as well as the first piezoelectric element 31. According to the present embodiment, therefore, attenuation of the tactile sensation provided by the piezoelectric element for providing the tactile sensation may be reduced and a good tactile sensation may be expected in operation by the user.

Second Embodiment

Next, an electronic device according to a second embodiment will be described.

According to the first embodiment, when the contact to the panel 10 is detected, the first piezoelectric element 31 and the second piezoelectric element 32 are driven. According to the second embodiment, vibration is not generated at a point when the contact to the panel 10 is detected. When the pressure by the user on the panel is increased while the contact to the panel 10 is detected, the first piezoelectric element 31 and the second piezoelectric element 32 are driven.

In order to substantialize such a control, according to the present embodiment, the first piezoelectric element 31 attached to the panel 10 detects the pressure on the panel 10. Generally, the piezoelectric element generates a voltage upon application of a pressure thereon, and deforms upon application of a voltage thereon. Therefore, the first piezoelectric element 31 may serve as a function unit for providing the tactile sensation by generating vibration (a tactile sensation providing unit) and as a function unit for detecting the pressure on the panel 10 (a pressure detection unit).

Such a pressure detection unit detects the pressure on the touch face of the panel 10 and may be constituted by using, for example, a strain gauge sensor or the piezoelectric element whose physical or electric characteristic (strain, resistance, the voltage and the like) changes according to the pressure.

For example, when the pressure detection unit is constituted by using the piezoelectric element or the like, for example, the piezoelectric element serving as the pressure detection unit changes the voltage (a value of the voltage) as the electric characteristic according to a load (force) (or a speed (acceleration) of a change of the load (force)) associated with the pressure on the panel 10. In this case, the pressure detection unit may notify the control unit 50 of the voltage (the value of the voltage (hereinafter, referred to simply as data)). The control unit 50 obtains the data by being notified from the pressure detection unit, or by detecting data associated with the piezoelectric element serving as the pressure detection unit. That is, the control unit 50 obtains the data based on the pressure on the panel 10. That is, the control unit 50 obtains the data based on the pressure from the pressure detection unit. Then, when the data based on the pressure satisfies the predetermined standard, the control unit 50 may determine that there is an operation intended by the user and generate the predetermined vibration. Here, the predetermined standard may be appropriately set based on a load characteristic of an intended push-button switch being pressed. Also, "when the data based on the pressure satisfies the predetermined standard" may include "when the value of the voltage (data) reaches a predetermined standard value", "when the value of the voltage (data) exceeds the predetermined standard value", or "when a value of the voltage (data) equal to the predetermined standard value is detected".

According to the second embodiment also, the control unit 50 controls such that the second piezoelectric element 32 is driven to output sound. Thereby, the second piezoelectric element of the electronic device 1, in a similar manner as the first embodiment, may substantialize the function to output sound and transmit the sound to the user.

According to the second embodiment, on the other hand, when the data based on the pressure detected by the first piezoelectric element 31 satisfies the predetermined standard while the panel 10 is detecting the contact, the control unit 50 controls to drive the first piezoelectric element 31. Accordingly, the first piezoelectric element of the electronic device 1 may substantialize the function to generate vibration while the pressure by the user is applied on the element and provide the tactile sensation to the user. According to the second embodiment, therefore, by appropriately adjusting a frequency, amplitude and intensity of vibration generated by the first piezoelectric element, a realistic tactile sensation similar to one obtained when a mechanical key is actually pressed down may be provided.

Then, as described above, in the case that a plurality of piezoelectric elements for different usages are attached to one panel, when the piezoelectric element for providing the tactile sensation is driven to generate vibration, the piezoelectric element for transmitting sound fixed to the panel may inhibit the vibration of the piezoelectric element for providing the tactile sensation. According to the present embodiment, therefore, when the data based on the pressure detected by the first piezoelectric element 31 satisfies the predetermined standard while the panel 10 is detecting the contact, the control unit 50 controls such that the second piezoelectric element 32 is driven as well as the first piezoelectric element 31. According to the present embodiment also, therefore, attenuation of the vibration provided by the piezoelectric element for providing the tactile sensation may be reduced and a good tactile sensation may be expected in operation by the user.

According to the second embodiment described above, the first piezoelectric element serves as the tactile sensation providing unit and also as the pressure detection unit. However, the first piezoelectric element may function as the tactile sensation providing unit and a pressure detection unit different from the tactile sensation providing unit may be provided. In this case, when the panel 10 detects the contact and, simultaneously, the data based on the pressure detected by the pressure detection unit satisfies the predetermined standard, the control unit 50 preferably controls such that the second piezoelectric element 32 is driven as well as the first piezoelectric element 31.

Although the embodiments are described based on figures and the embodiments, it is to be understood that those who are skilled in the art may easily vary or alter in a multiple manner based on the disclosure herein. Accordingly, such variation and alteration are included in a scope of the present invention. For example, a function and the like included in each component may be rearranged by combining a plurality of components or dividing the component without logical inconsistency.

For example, in each of the embodiments described above, the display unit 20 arranged on the rear side of the panel displays the objects and the panel 10 detects the contact by the user. However, the present invention is not limited to the embodiments but is also applicable to an embodiment in which, for example, there is no display unit 20 but the objects are directly printed with ink or the like on the panel 10.

According to the above embodiments, also, the panel 10 is used for detecting the contact thereto. That is, the panel 10 according to the above embodiments is assumed to be a member such as a so-called touch sensor. The touch panel used for the electronic device according to the above embodiments, however, may be any panel that may be contacted by a contact object such as the user's finger and the stylus pen.

For example, the panel used for the electronic device according to the above embodiments may be a member that does not detect a position of a contact by the contact object on the panel (that is, a member having no sensing function). An electronic device having such a configuration, by providing a pressure detection unit for detecting the pressure on the panel in addition, for example, may determine that, based on the pressure detected by the pressure detection unit, there is the contact to the panel.

Also, the electronic device 1 described above, by vibrating the panel 10, may transmit the air conduction sound and the vibration sound through a part of the user's body (for example, the cartilage of the outer ear). Therefore, when sound at a volume similar to that of a conventional dynamic receiver is output, less sound is transmitted around the electronic device 1 through air vibration due to vibration of the panel 10, in comparison to the dynamic receiver. Accordingly, the electronic device 1 may be suitable for listening to, for example, a recorded message on a train or the like.

Moreover, the electronic device 1 described above transmits the human vibration sound by vibrating the panel 10. Therefore, when the user is wearing earphones or headphones, for example, the user may hear the sound via the earphones or the headphones and a part of the user's body by contacting the electronic device 1 to the earphones or the headphones.

Further, the electronic device 1 described above transmits the sound to the user by vibrating the panel 10. Therefore, when the electronic device 1 does not have a separate dynamic receiver, an opening (a sound opening) for transmitting voice does not need to be formed on the housing of the electronic device 1, which enables a simple waterproof structure of the electronic device 1. When the electronic device 1 has the dynamic receiver, the sound opening is preferably sealed with a member that ventilates while blocking liquid. Such a member for ventilating while blocking liquid may be, for example, Gore-Tex (registered trademark).

EXPLANATION OF REFERENCE NUMERALS

1 Electronic device
10 Panel
20 Display unit
31 First piezoelectric element
32 Second piezoelectric element
40 Input unit
50 Control unit
60 Housing
70 Joint member

What is claimed is:

1. An electronic device comprising:
   a panel;
   a housing;
   a first piezoelectric element and a second piezoelectric element that are attached to the panel; and
   a control unit configured to control such that the second piezoelectric element is driven to output sound and, when the panel detects a contact, to control such that the first piezoelectric element is driven, as well as the second piezoelectric element, wherein
   the second piezoelectric element is attached to the panel in a position near a portion of the panel where the panel is attached to the housing, and the first piezoelectric element is attached to the panel in another position farther than the position from the portion.

2. An electronic device comprising:
   a panel;
   a housing;
   a first piezoelectric element attached to the panel for detecting a pressure on the panel;
   a second piezoelectric element attached to the panel; and
   a control unit configured to control such that the second piezoelectric element is driven to output sound and, when data based on the pressure detected by the first piezoelectric element satisfies a predetermined standard while the panel is detecting a contact, to control such that the first piezoelectric element is driven as well as the second piezoelectric element, wherein the second piezoelectric element is attached to the panel in a position near a portion of the panel where the panel is attached to the housing, and the first piezoelectric element is attached to the panel in another position farther than the position from the portion.

3. An electronic device comprising:

a panel;

a housing;

a first piezoelectric element for providing a tactile sensation;

a second piezoelectric element for transmitting sound; and a control unit, wherein the first piezoelectric element and the second piezoelectric element are attached to the panel, the control unit, when the panel detects a contact, controls such that the second piezoelectric element is driven as well as the first piezoelectric element, and the second piezoelectric element is attached to the panel in a position near a portion of the panel where the panel is attached to the housing, and the first piezoelectric element is attached to the panel in another position farther than the position from the portion.

4. The electronic device according to claim 3, comprising:

a pressure detection unit configured to detect a pressure on a panel, wherein the control unit, when data based on the pressure detected by the pressure detection unit satisfies a predetermined standard while the panel is detecting the contact, controls such that the second piezoelectric element is driven as well as the first piezoelectric element.

* * * * *